May 31, 1949.         LE ROY F. JONAS         2,471,527
DRINKING CUP FOR MINK OR OTHER PENNED ANIMALS
Filed Feb. 14, 1947

INVENTOR.
L. F. JONAS
BY Young Wright
ATTORNEYS.

Patented May 31, 1949

2,471,527

UNITED STATES PATENT OFFICE 2,471,527

DRINKING CUP FOR MINK OR OTHER PENNED ANIMALS

Le Roy F. Jonas, Wausau, Wis.

Application February 14, 1947, Serial No. 728,541

1 Claim. (Cl. 119—18)

My invention refers to drinking cups for confined minks or other animals. The primary object of my invention is to provide a fountain pan having a U-shaped cup extension which projects into the animal cage through an opening therein. The cage opening has secured thereto a metal division wall, also U-shaped for closing the opening and also for partly closing the throat between the pan and cup whereby a mink is blocked from escaping through the cage opening.

A further object of my invention is to provide a slight space between the fixed division wall and the throat of the cup whereby water level is maintained constantly between the cup and exterior pan.

A further object of my invention is to provide the pan with upstanding clips in pivotal union with the cage wire above its opening, whereby the pan may be swung upwardly to an approximate vertical position whereby the cup will swing outwardly and drain the pan when it is desired.

A further object of my invention is to provide a lock and release bar in pivotal connection with the pan rim, the bar having a locking tongue at its free end for engagement with one of the cage wire strands whereby the pan is locked against movement upon its pivots and when it is desired to dump the pan for cleaning purposes, the bar is freed from its locked engagement to permit the pan to swing upwardly upon its pivot clips.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Figure 1:
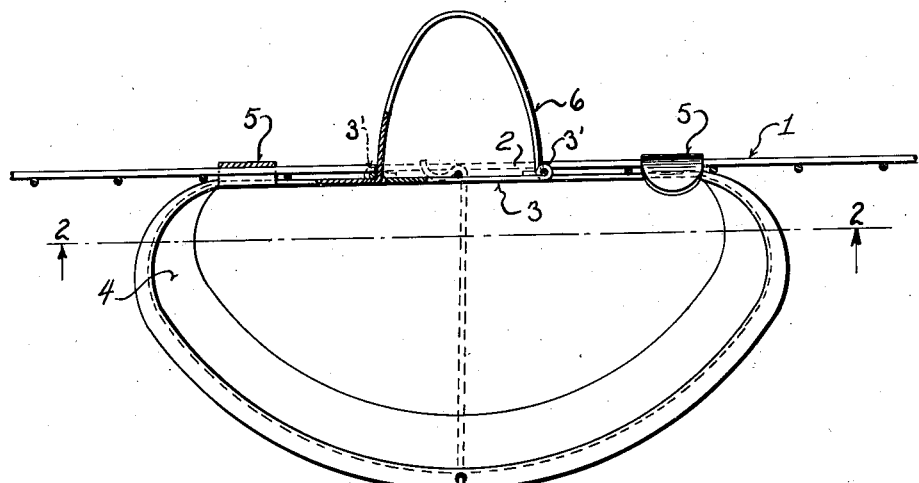
Figure 1 represents a plan view of a drinking fountain embodying the features of my invention, the same being in section as indicated by line 1—1 of Figure 2.

Referring by characters to the drawing, 1 indicates the metallic cross bars of a wire cage having certain of the wires cut away to form an opening 2 therein. This opening is partially closed by a U-shaped division plate 3 having at its upper base a pair of tongues 3'—3', which tongues are folded over vertical wires of the cage on either side of the opening therein.

An approximately enlarged semicircular pan 4 is fitted to the outer face of the cage wires and the upper edge of said pan is provided with open mouthed clips, 5—5, which clips engage one of the horizontal cage wires whereby the pan is held suspended and in pivotal connection with the cage.

Figure 2:
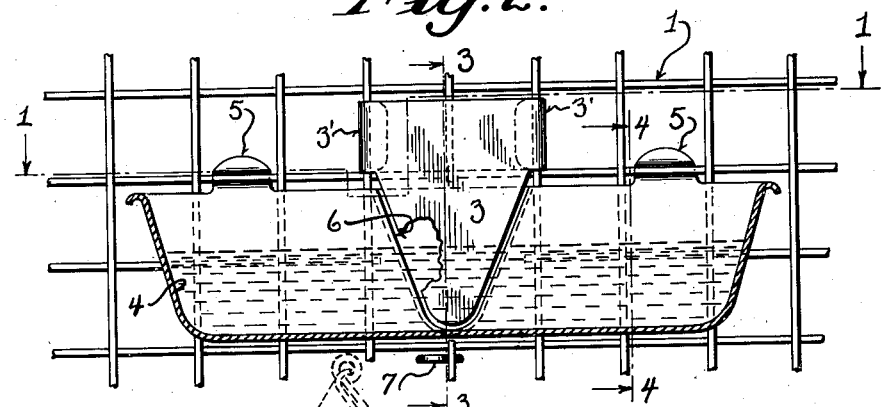
Figure 2 is a longitudinal sectional face view of a fragment of the cage and water pan, the same being in section as indicated by line 2—2 of Figure 1.

The pan is provided with a centrally positioned U-shaped cup extension 6, which extension projects within the cage through the opening 2 thereof and, as best shown in Figure 2 of the drawings, when said cup is in its normal drinking position, the throat thereof is closed by the division plate 3, the edges of which are spaced from the inner edges of the cup to form a narrow water channel between said cup and pan.

Thus the water supply in the comparatively large area pan is maintained at the same level as that within the projecting drinking cup. Due to the above described structure, the mink are positively confined from escape through the cup and furthermore, due to the habits of mink, they will frequently deposit foreign matter in the cup, which foreign matter, due to the division wall, will be held in the bottom of the cup and in the event the mink should scratch this foreign matter out of the cup together with water therein, the main body of the water contained in the pan will be clear of such foreign deposits.

Figure 3:
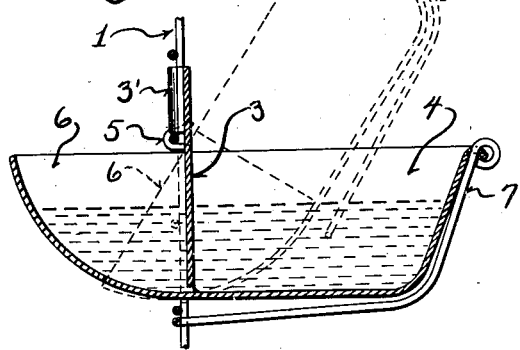
Figure 3 is a cross section of the pan and cage, the section being indicated by line 3—3 of Figure 2.
Figure 4:
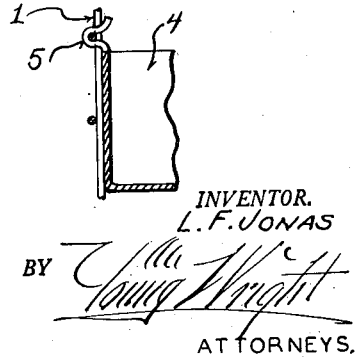
Figure 4 is a detailed cross section illustrating the pivot clip connection between the pan and cage, the section being indicated by line 4—4 of Figure 2.

In order to lock the drinking fountain in its normal horizontal position, as shown in Figure 3 of the drawings, the rim of the cup has pivoted thereto a lock and release bar 7, which bar extends downwardly and is bowed to conform to the pan, the inner free end of the same terminating with a hooked end, which end engages one of the vertically positioned cage wires whereby the pan is firmly locked in its normal position.

Should it be desired to drain or empty the pan for fresh water, the lock and release bar is disengaged from the cage and the pan, as best illustrated in dotted lines of Figure 3, is swung upwardly whereby the U-shaped cup will fully drain off all water and foreign matter that may be in the bottom of the cup.

It will also be noted that the U-shaped walls of the cup which conform to the edges of the division plate, are free to swing back and forth without, at any time, developing an opening which would permit escape of the animals from within the cage.

The cup, as shown in its normal water supply position, may be reversed in freezing weather and with this in view the cup is disconnected from its pivot engagement with the cage wires and reversed in its position whereby the pan will be suspended within the cage by its clips while the projecting cup will be outside of said cage.

The above reversed position is to permit the full volume of water contained in the pan to freeze whereby access to this frozen body of water is permitted whereby the mink may lick the same from time to time.

I claim:

A water container for animal cages having an opening therein, comprising a pan in removable pivotal connection with the cage, a U-shaped cup extending from the pan through the cage opening, a division plate secured to the cage above the opening extending into the U-shaped cup there being a space between the cup edges and division plate to permit free flow of water between the pan and spout, and a lock and release bar pivoted to the pan having a hook end engagable with the cage wire.

LE ROY F. JONAS.

REFERENCES CITED

The following references are of record in the file of this patent:

UNITED STATES PATENTS

| Number | Name | Date |
|---|---|---|
| 204,562 | Gunther | June 4, 1878 |
| 2,206,383 | Adams | July 2, 1940 |

FOREIGN PATENTS

| Number | Country | Date |
|---|---|---|
| 667,579 | France | June 18, 1929 |